(12) United States Patent
Sugimoto

(10) Patent No.: US 8,234,030 B2
(45) Date of Patent: Jul. 31, 2012

(54) VEHICLE AND CONTROL METHOD OF VEHICLE

(75) Inventor: Hitoki Sugimoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 317 days.

(21) Appl. No.: 12/451,156

(22) PCT Filed: Apr. 1, 2008

(86) PCT No.: PCT/JP2008/056460
§ 371 (c)(1),
(2), (4) Date: Oct. 28, 2009

(87) PCT Pub. No.: WO2008/139785
PCT Pub. Date: Nov. 20, 2008

(65) Prior Publication Data
US 2010/0076635 A1 Mar. 25, 2010

(30) Foreign Application Priority Data
May 8, 2007 (JP) .................................. 2007-123884

(51) Int. Cl.
*F02M 25/07* (2006.01)
(52) U.S. Cl. .......................................... 701/22; 123/673
(58) Field of Classification Search .................. 701/22; 123/406.26–406.28, 435, 568.21, 344, 395, 123/349, 350, 406.41–406.43, 406.47, 480, 123/486, 673, 406.22
See application file for complete search history.

(56) References Cited

U.S. PATENT DOCUMENTS

| 5,190,017 A | * | 3/1993 | Cullen et al. .................. 123/676 |
| 6,850,834 B1 | * | 2/2005 | Yu et al. ........................ 701/108 |
| 6,944,530 B2 | * | 9/2005 | Russell et al. ................. 701/104 |

FOREIGN PATENT DOCUMENTS

| JP | A-9-144609 | 6/1997 |
| JP | A-2000-257498 | 9/2000 |
| JP | A-2001-140706 | 5/2001 |
| JP | A-2006-194215 | 7/2006 |
| JP | A-2007-76551 | 3/2007 |

OTHER PUBLICATIONS

International Preliminary Report on Patentability issued on Nov. 24, 2009 in corresponding International Application No. PCT/JP2008/056460.

* cited by examiner

*Primary Examiner* — Dalena Tran
(74) *Attorney, Agent, or Firm* — Oliff & Berridge, PLC

(57) ABSTRACT

Upon satisfaction of the condition for making the malfunction diagnosis at least one of the EGR system, the air-fuel ratio sensor and the oxygen sensor during the fuel cut of the engine, a fuel cut of the engine and performing the mortaring of the engine by means of the motor MG1 are continued until the completion of the malfunction diagnoses of all objects, of which the each condition for making the malfunction diagnosis is satisfied among the EGR system, the air-fuel ratio sensor and the oxygen sensor. This arrangement ensures the occasions for making the malfunction diagnoses of the EGR system, the air-fuel ratio sensor and the oxygen sensor.

9 Claims, 10 Drawing Sheets

VEHICLE AND CONTROL METHOD OF VEHICLE

TECHNICAL FIELD

The present invention relates to a vehicle and a control method of the vehicle.

BACKGROUND ART

One proposed structure of a vehicle has an engine configured to output power for driving the vehicle and an exhaust gas recirculation (EGR) system configured to circulate a part of exhaust from the engine into a gas intake line of the internal combustion engine. The proposed vehicle is driven only with output power of the engine (see, for example, Patent Document 1). This proposed vehicle makes a malfunction diagnosis of the exhaust gas recirculation system during decrease in speed and a fuel cut of the engine. Therefore the proposed vehicle enables restraint of torque shock by variation of ignition in comparison with a vehicle that makes the malfunction diagnosis of the exhaust gas recirculation during steady operation of the engine.
Patent Document 1: Japanese Patent Laid-Open No. H9-144609

DISCLOSURE OF THE INVENTION

A vehicle that is driven with at least one of output power of the engine and output power of a motor have few occasions to be driven by output power of the motor with continuation of stopping fuel injection into the engine. For this reason, when the malfunction diagnosis of the exhaust gas recirculation is made during the fuel cut, rotation of the engine may stop before the malfunction diagnosis is completed and the insufficient occasions for making the malfunction diagnosis may not be ensured.

In the vehicle and the control method of the vehicle of the invention, there would thus be a demand for ensuring occasions for making a malfunction diagnosis of an exhaust circulation structure configured to circulate exhaust from the internal combustion engine into a gas intake line of the internal combustion engine.

The present invention accomplishes the main demand mentioned above by the following configurations applied to the vehicle and the control method of the vehicle.

According to one aspect, the present invention is directed to a vehicle. The vehicle includes: an internal combustion engine system having an internal combustion engine configured to output power to a drive shaft connected with drive wheels, and an exhaust circulation structure configured to circulate exhaust from the internal combustion engine into a gas intake line of the internal combustion engine; a motoring structure configured to perform a motoring of the internal combustion engine; a motor configured to input and output power from and to the drive shaft; and a controller configured to, upon satisfaction of a first predetermined condition while a fuel injection into the internal combustion engine is stopped, make a malfunction diagnosis of the exhaust circulation structure and control the internal combustion engine system, the motoring structure and the motor to output a driving force with continuation of stopping the fuel injection into the internal combustion engine and of performing the motoring of the internal combustion engine by means of the motoring structure at least until the malfunction diagnosis of the exhaust circulation structure is completed.

The vehicle according to this aspect of the invention, upon satisfaction of a first predetermined condition while a fuel injection into the internal combustion engine is stopped, makes a malfunction diagnosis of the exhaust circulation structure configured to circulate exhaust from the internal combustion engine and controls the internal combustion engine system, the motoring structure and the motor to output a driving force with continuation of stopping the fuel injection into the internal combustion engine and of performing the motoring of the internal combustion engine by means of the motoring structure at least until the malfunction diagnosis of the exhaust circulation structure is completed. Stopping the fuel injection into the internal combustion engine and performing the motoring of the internal combustion engine by means of the motoring structure are continued at least until the malfunction diagnosis of the exhaust circulation structure is completed. This arrangement enables to ensure occasions for making the malfunction diagnosis of the exhaust circulation structure.

In one preferable application of the vehicle of the invention, the controller may make the malfunction diagnosis of the exhaust circulation structure upon satisfaction of the first predetermined condition that includes at least one of multiple conditions including a condition that a water temperature of the internal combustion engine is not less than a first predetermined water temperature, a condition that an intake air temperature of the internal combustion engine is not less than a predetermined temperature, a condition that a variation level of a rotation speed of the internal combustion engine is within a predetermined variation level range, a condition that a first predetermined time elapses after starting the internal combustion engine, a condition that a vehicle speed is not less than a predetermined vehicle speed, and a condition that stopping the fuel injection continues for a second predetermined time.

In another preferable application of the vehicle of the invention, the internal combustion engine system may have: a purification catalyst configured to purify the exhaust from the internal combustion engine; and an oxygen detector configured to detect a oxygen concentration in exhaust passing through the purification catalyst, and the controller may, upon satisfaction of a second predetermined condition when the fuel injection into the internal combustion engine is stopped, make a malfunction diagnosis of the oxygen detector and control the internal combustion engine system and the motoring structure so as to continue to stop the fuel injection into the internal combustion engine and to perform the motoring of the internal combustion engine by means of the motoring structure at least until the malfunction diagnosis of the oxygen detector is completed. This arrangement enables to ensure occasions for making the malfunction diagnosis of the oxygen detector. In this case, the controller may make the malfunction diagnosis of the oxygen detector upon satisfaction of the second predetermined condition that includes at least one of multiple conditions including a condition that a water temperature of the internal combustion engine is not less than a second predetermined water temperature, a condition that a state of the oxygen detector is a first predetermined state, and a condition that stopping the fuel injection continues for a third predetermined time The first predetermined state may be a state where the oxygen detector is operable with adequate performance.

In another preferable application of the vehicle of the invention, the internal combustion engine system may have an air-fuel ratio detector configured to detect air-fuel ratio, and the controller may, upon satisfaction of a third predetermined condition when the fuel injection into the internal combustion engine is stopped, make a malfunction diagnosis of the air-fuel ratio detector and control the internal combustion engine system and the motoring structure so as to continue to stop the fuel injection into the internal combustion engine and to perform the motoring of the internal combustion engine by means of the motoring structure at least until the malfunction diagnosis of the air-fuel ratio detector is completed. This arrangement enables to ensure occasions for making the malfunction diagnosis of the air-fuel ratio detector. In this case, the controller may make the malfunction diagnosis of the air-fuel ratio detector upon satisfaction of the third predetermined condition that includes at least one of multiple conditions including a condition that a water temperature of the internal combustion engine is not less than a third predetermined water temperature, a condition that a state of the air-fuel detector is a second predetermined state, and a condition that stopping the fuel injection continues for a fourth predetermined time. The second predetermined state may be a state where the air-fuel ratio detector is operable with adequate performance.

In one preferable embodiment of the vehicle of the invention, the motoring structure may be an electric power-mechanical power input output assembly that is connected with the drive shaft and with an output shaft of the internal combustion engine in such a manner as to be rotatable independently of the drive shaft and inputs and outputs power to and from the drive shaft and the output shaft through input and output of electric power and mechanical power. In this embodiment, the electric power-mechanical power input output assembly may have: a generator configured to input and output power; and a three shaft-type power input output assembly connected with three shafts, the drive shaft, the output shaft and a rotating shaft of the generator and designed to input and output power to residual shaft based on powers input from and output to any two shafts among the three shafts.

According to another aspect, the present invention is directed to a control method of a vehicle. The vehicle includes: an internal combustion engine system having an internal combustion engine configured to output power to a drive shaft connected with drive wheels, and an exhaust circulation structure configured to circulate exhaust from the internal combustion engine into a gas intake line of the internal combustion engine; a motoring structure configured to perform a motoring of the internal combustion engine; and a motor configured to input and output power from and to the drive shaft. The control method, upon satisfaction of a first predetermined condition while a fuel injection into the internal combustion engine is stopped, makes a malfunction diagnosis of the exhaust circulation structure and controls the internal combustion engine system, the motoring structure and the motor to output a driving force with continuation of stopping the fuel injection into the internal combustion engine and of performing the motoring of the internal combustion engine by means of the motoring structure at least until the malfunction diagnosis of the exhaust circulation structure is completed.

The control method of the vehicle according to this aspect of the invention, upon satisfaction of a first predetermined condition while a fuel injection into the internal combustion engine is stopped, makes a malfunction diagnosis of the exhaust circulation structure configured to circulate exhaust from the internal combustion engine and controls the internal combustion engine system, the motoring structure and the motor to output a driving force with continuation of stopping the fuel injection into the internal combustion engine and of performing the motoring of the internal combustion engine by means of the motoring structure at least until the malfunction diagnosis of the exhaust circulation structure is completed. Stopping the fuel injection into the internal combustion engine and performing the motoring of the internal combustion engine by means of the motoring structure are continued at least until the malfunction diagnosis of the exhaust circulation structure is completed. This arrangement enables to ensure occasions for making the malfunction diagnosis of the exhaust circulation structure.

BEST MODES OF CARRYING OUT THE INVENTION

One mode of carrying out the invention is described below as a preferred embodiment.

Figure 1:
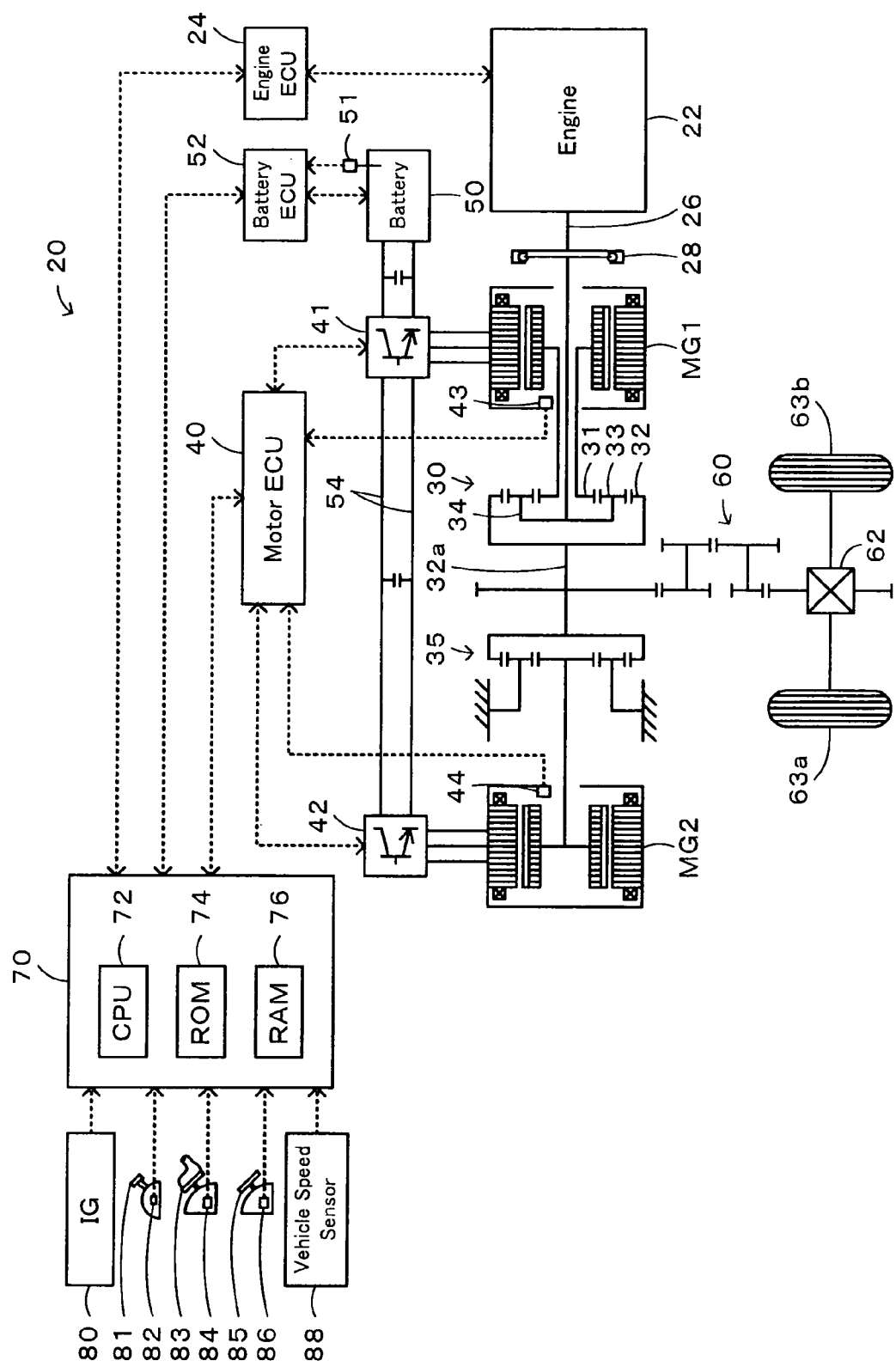
FIG. 1 schematically illustrates the configuration of a hybrid vehicle 20 in one embodiment of the invention.

FIG. 1 schematically illustrates the configuration of a hybrid vehicle 20 equipped with a power output apparatus in one embodiment of the invention. As illustrated, the hybrid vehicle 20 of the embodiment includes an engine 22, a three shaft-type power distribution integration mechanism 30 that is connected to a crankshaft 26 or an output shaft of the engine 22 via a damper 28, a motor MG1 that is connected to the power distribution integration mechanism 30 and has power generation capability, a reduction gear 35 that is attached to a ring gear shaft 32a or a drive shaft linked to the power distribution integration mechanism 30, a motor MG2 that is connected to the reduction gear 35, and a hybrid electronic control unit 70 that controls the operations the whole hybrid vehicle 20.

Figure 2:
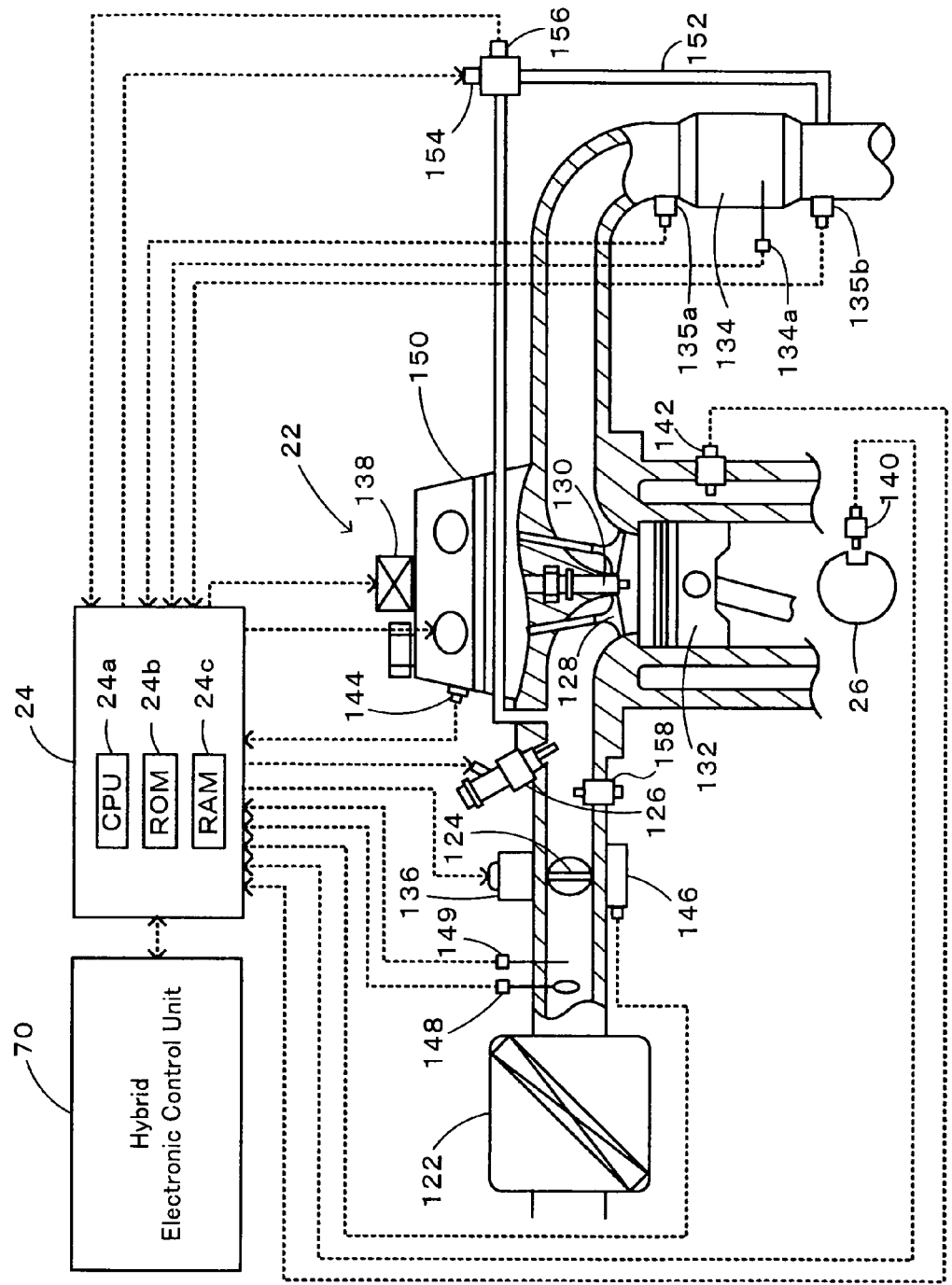
FIG. 2 schematically shows the structure of an engine 22.

The engine 22 is constructed as an internal combustion engine designed to consume a hydrocarbon fuel, such as gasoline or light oil, and thereby output power. As illustrated in FIG. 2, the air cleaned by an air cleaner 122 and taken in via a throttle valve 124 is mixed with the atomized fuel injected from a fuel injection valve 126 to the air-fuel mixture. The air-fuel mixture is introduced into a combustion chamber by means of an intake valve 128. The introduced air-fuel mixture is ignited with spark made by a spark plug 130 to be explosively combusted. The reciprocating motions of a piston 132 pressed down by the combustion energy are converted into rotational motions of the crankshaft 26. The exhaust from the engine 22 goes through a catalytic converter 134 that includes three-way catalyst designed to convert toxic components included in the exhaust, that is, carbon monoxide (CO), hydrocarbons (HC), and nitrogen oxides (NOx), into harmless components and is discharged to the outside air. At the downstream of the catalytic converter 134, an EGR tube 152 that circulates exhaust into an intake line and an EGR valve 154 that regulates a recirculation amount of the exhaust into the gas intake line are attached. The engine 22 is thus designed to supply the exhaust as uncombusted gas into the gas intake line and introduce the mixture of the air, the purified exhaust, and the fuel into the combustion chamber, by opening and closing the EGR valve 154. The EGR tube 152 and the EGR valve 154 in the embodiment correspond to an exhaust circulation structure. The equivalent of the exhaust circulation structure is defined as an EGR system below. An air-fuel ratio sensor 135$a$ is attached at the upstream side of the catalytic converter 134 and an oxygen sensor 135$b$ is attached at the downstream side of the catalytic converter 134. The air-fuel ratio sensor 135$a$ in the embodiment is constructed as a known sensor designed to hold zirconia solid electrolyte between two electrodes. This air-fuel ratio sensor 135$a$ in the embodiment is a sensor designed to output an output current Iaf as a limiting current varying linearly according to an air-fuel ratio of the air-fuel mixture of the engine 22 when the predetermined voltage (for example, 0.4V) is applied to the sensor. The oxygen sensor 135$b$ in the embodiment is constructed as a known sensor designed to hold zirconia solid electrolyte between two electrodes. This oxygen sensor 135$b$ in the embodiment is a sensor designed to output an output voltage Vo varying significantly according to whether the air-fuel ratio of the air-fuel mixture of the engine 22 is at a rich side or a lean side. This oxygen sensor 135$b$, for example, outputs approximately 1V when the air-fuel ratio is at a rich side and approximately 0V when the air-fuel ratio is at a lean side.

The engine 22 is under control of an engine electronic control unit (hereafter referred to as engine ECU) 24. The engine ECU 24 is constructed as a microprocessor including a CPU 24$a$, a ROM 24$b$ configured to store processing programs, a RAM 24$c$ configured to temporarily store data, input and output ports (not shown), and a communication port (not shown). The engine ECU 24 receives, via its input port, signals from various sensors designed to measure and detect the operating conditions of the engine 22. The signals input into the engine ECU 24 include a crank position from a crank position sensor 140 detected as the rotational position of the crankshaft 26, a cooling water temperature θw from a water temperature sensor 142 measured as the temperature of cooling water in the engine 22, cam positions from a cam position sensor 144 detected as the rotational positions of camshafts driven to open and close the intake valve 128 and an exhaust valve for gas intake and exhaust into and from the combustion chamber, a throttle position from a throttle valve position sensor 146 detected as the position of the throttle valve 124, an air flow meter signal from an air flow meter 148 located in an air intake conduit, an intake air temperature θa from a temperature sensor 149 located in the air intake conduit, an intake air pressure Pin from an intake air pressure sensor 158 detected as a pressure in an air intake conduit, a catalyst temperature θc from a temperature sensor 134$a$ detected as a temperature of the three-way catalyst of the catalytic converter 134, the output current Iaf from the air-fuel ratio sensor 135$a$, the output voltage Vo from the oxygen sensor 135$b$, an EGR gas temperature from a temperature sensor 156 detected as a temperature of the EGR gas in the EGR tube 152. The engine ECU 24 outputs, via its output port, diverse control signals and driving signals to drive and control the engine 22. The signals output from the engine ECU 24 include driving signals to the fuel injection valve 126, driving signals to a throttle valve motor 136 driven to regulate the position of the throttle valve 124, control signals to an ignition coil 138 integrated with an igniter, control signals to a variable valve timing mechanism 150 to vary the open and close timings of the intake valve 128, and driving signals to a EGR valve 154. The engine ECU 24 establishes communication with the hybrid electronic control unit 70 to drive and control the engine 22 in response to control signals received from the hybrid electronic control unit 70 and to output data regarding the operating conditions of the engine 22 to the hybrid electronic control unit 70 according to the requirements. The engine ECU 24 also performs an arithmetic operation to compute a rotation speed of the crankshaft 26 or a rotation speed Ne of the engine 22 from the crank position input from the crank position sensor 140.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32$a$. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63$a$ and 63$b$ via the gear mechanism 60, and the differential gear 62 from ring gear shaft 32$a$.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control, unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements. The motor ECU 40 also performs arithmetic operations to compute rotation speeds Nm1 and Nm2 of the motors MG1 and MG2 from the output signals of the rotational position detection sensors 43 and 44.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 also performs various arithmetic operations for management and control of the battery 50. A remaining charge or state of charge (SOC) of the battery 50 is calculated from an integrated value of the charge-discharge current measured by the current sensor. An input limit Win as an allowable charging electric power to be charged in the battery 50 and an output limit Wout as an allowable discharging electric power to be discharged from the battery 50 are set corresponding to the calculated state of charge (SOC) and the battery temperature Tb.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 3:
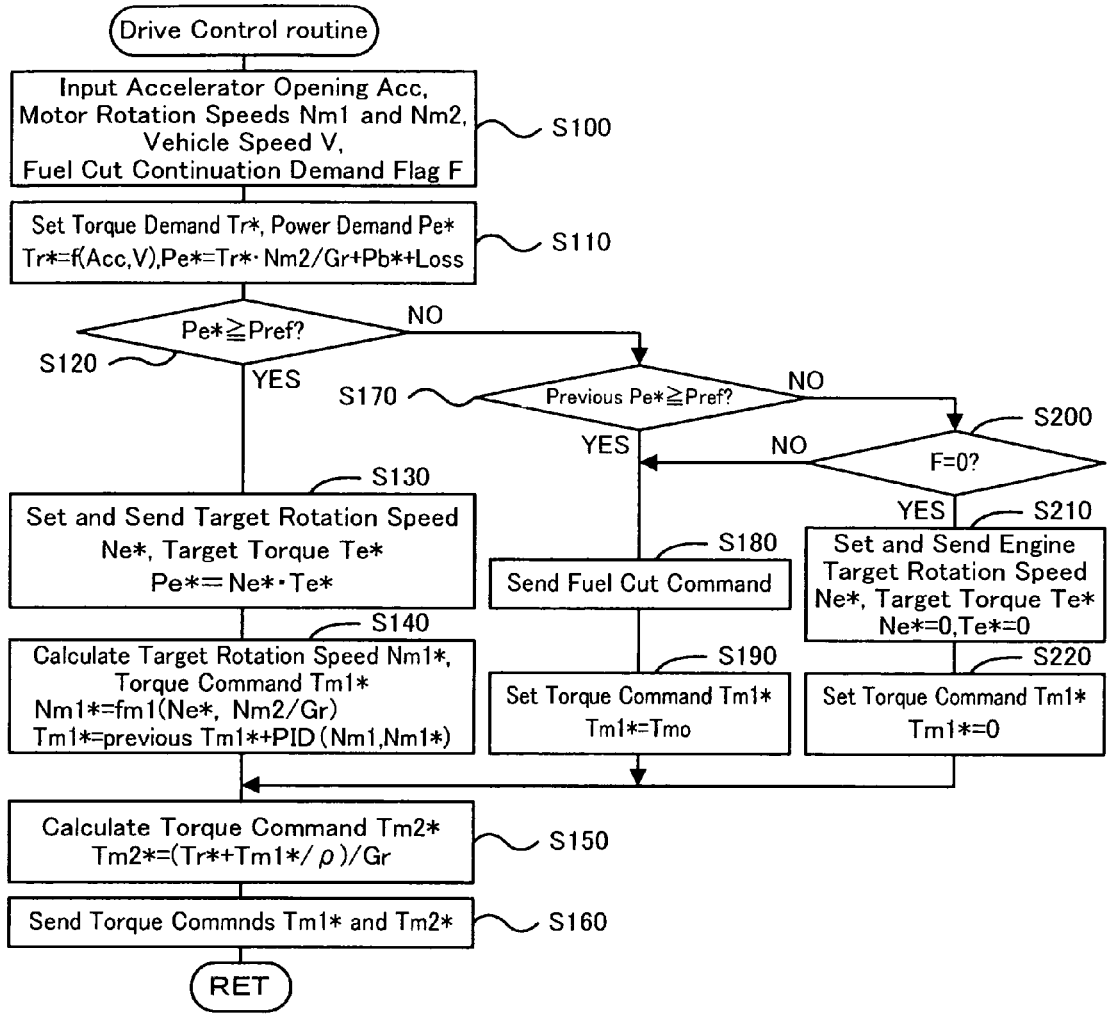
FIG. 3 is a flowchart showing a drive control routine executed by a hybrid electronic control unit 70.

The description regards the operations of the hybrid vehicle 20 of the embodiment having the configuration discussed above. FIG. 3 is a flowchart showing a drive control routine executed by the hybrid electronic control unit 70. This routine is performed repeatedly at preset time intervals (for example, at every several msec).

Figure 4:
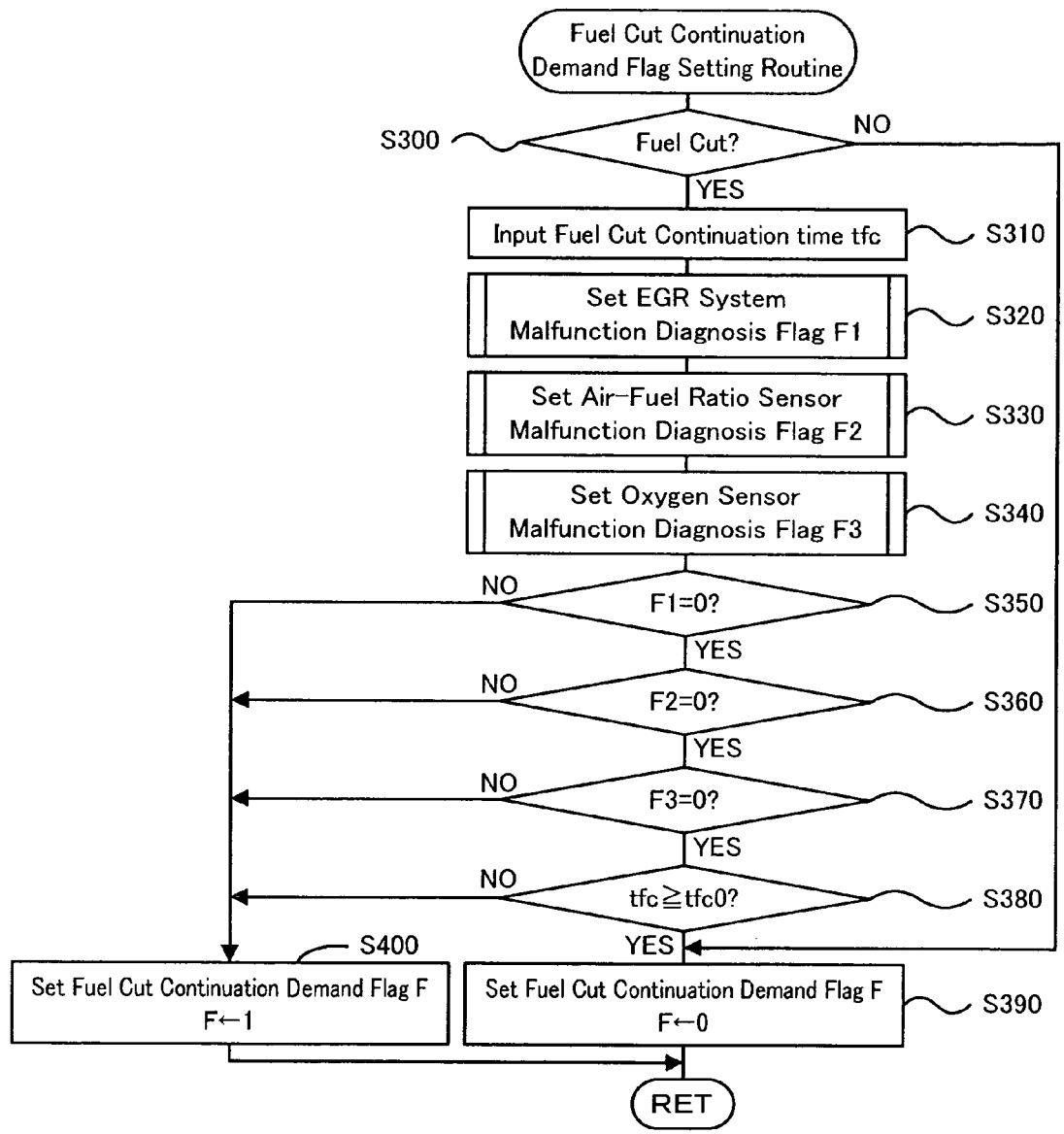
FIG. 4 is a flowchart showing a fuel cut continuation demand flag setting routine executed by an engine ECU 24.

In the drive control routine of FIG. 3, the CPU 72 of the hybrid electronic control unit 70 first inputs various data required for control, that is, the accelerator opening Acc from the accelerator pedal position sensor 84, the vehicle speed V from the vehicle speed sensor 88, the rotation speeds Nm1 and Nm2 of the motors MG1 and MG2, a fuel cut continuation demand flag F (step S100). The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The fuel cut continuation demand flag F is set to 1 when the engine ECU 24 demands continuation of the fuel cut to the hybrid electronic control unit 70 and is set to 0 when the engine ECU 24 does not demand continuation of the fuel cut to the hybrid electronic control unit 70, by a fuel cut continuation demand flag setting routine as shown in FIG. 4, and is received from the engine ECU 24 by communication. The details of the fuel cut continuation demand flag setting routine executed by the engine ECU 24 are described with suspension of the description of the drive control routine of FIG. 3.

In the fuel cut continuation demand flag setting routine, the CPU 24a of the engine ECU 24 first determines whether or not a fuel cut defined as stopping fuel injection from the fuel injection valve 126 is performed (step S300). Upon determination that the fuel cut is not performed (when fuel injection from the fuel injection valve 126 is performed, and when the engine 22 is stopped), the CPU 24a determines it does not demand continuation of the fuel cut. The CPU 24a then sets the fuel cut continuation demand flag F to 1 (step S390) and terminates this routine.

Figure 5:
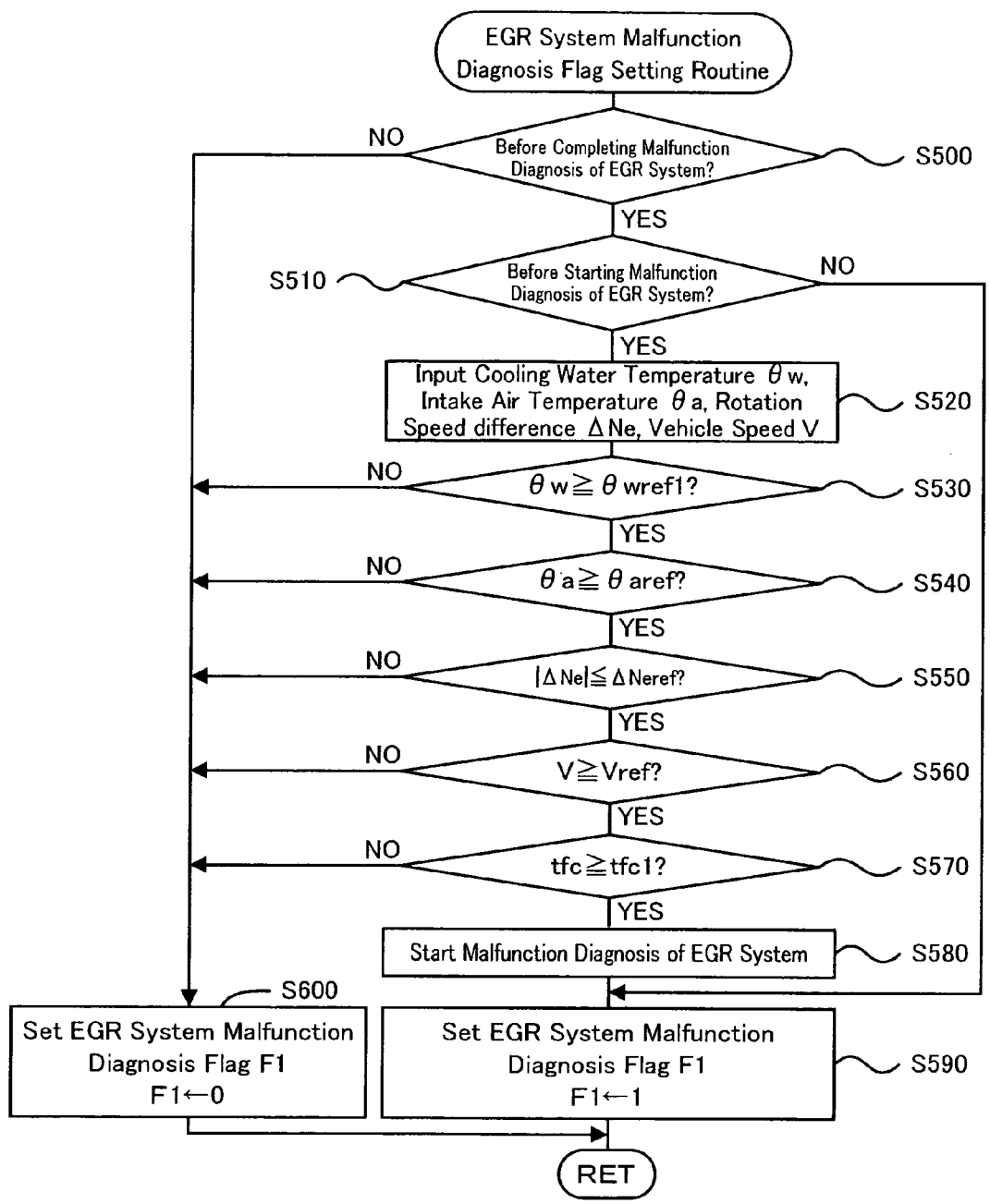
FIG. 5 is a flowchart showing an EGR system malfunction diagnosis flag setting routine.
Figure 6:
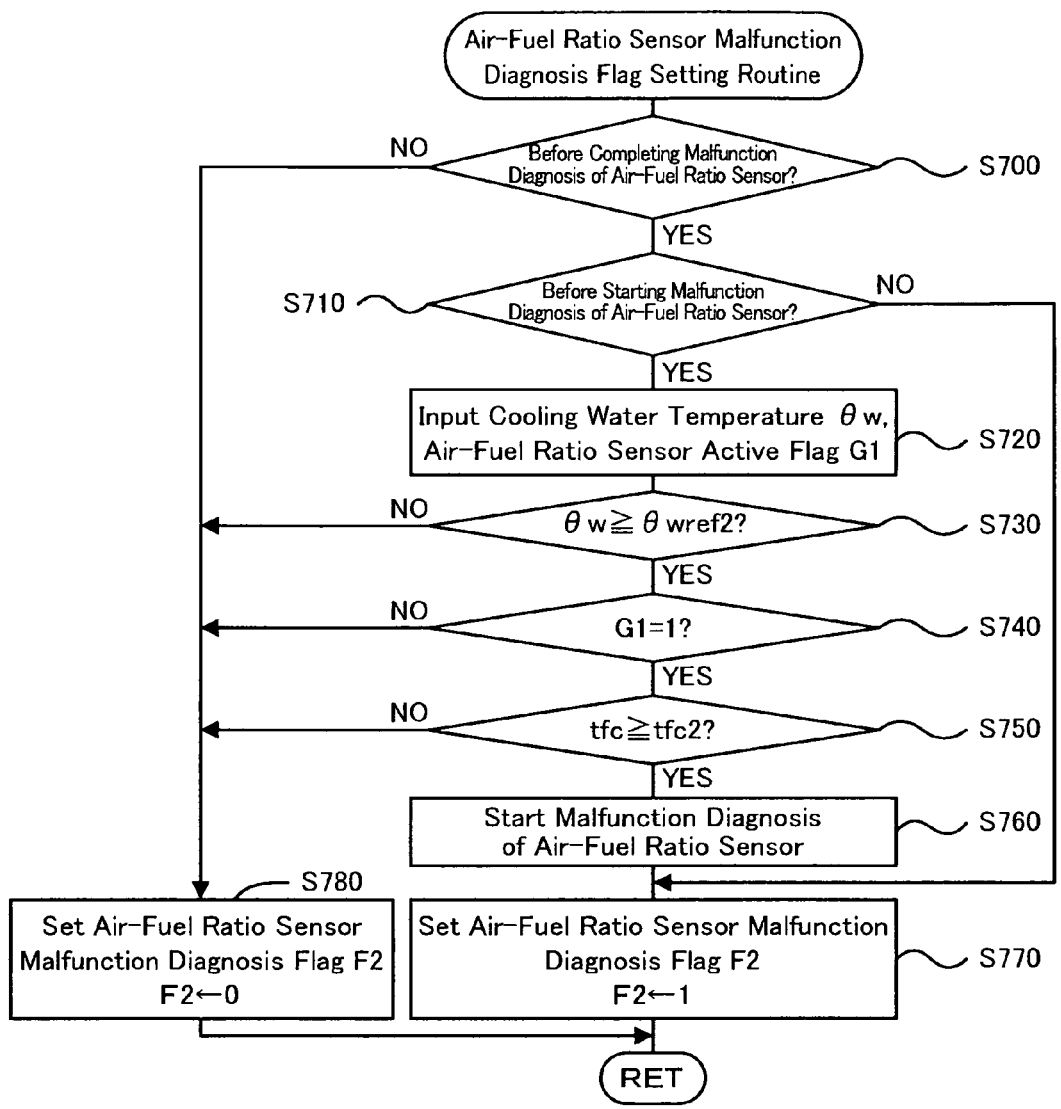
FIG. 6 is a flowchart showing an air-fuel ratio sensor malfunction diagnosis flag setting routine.
Figure 7:
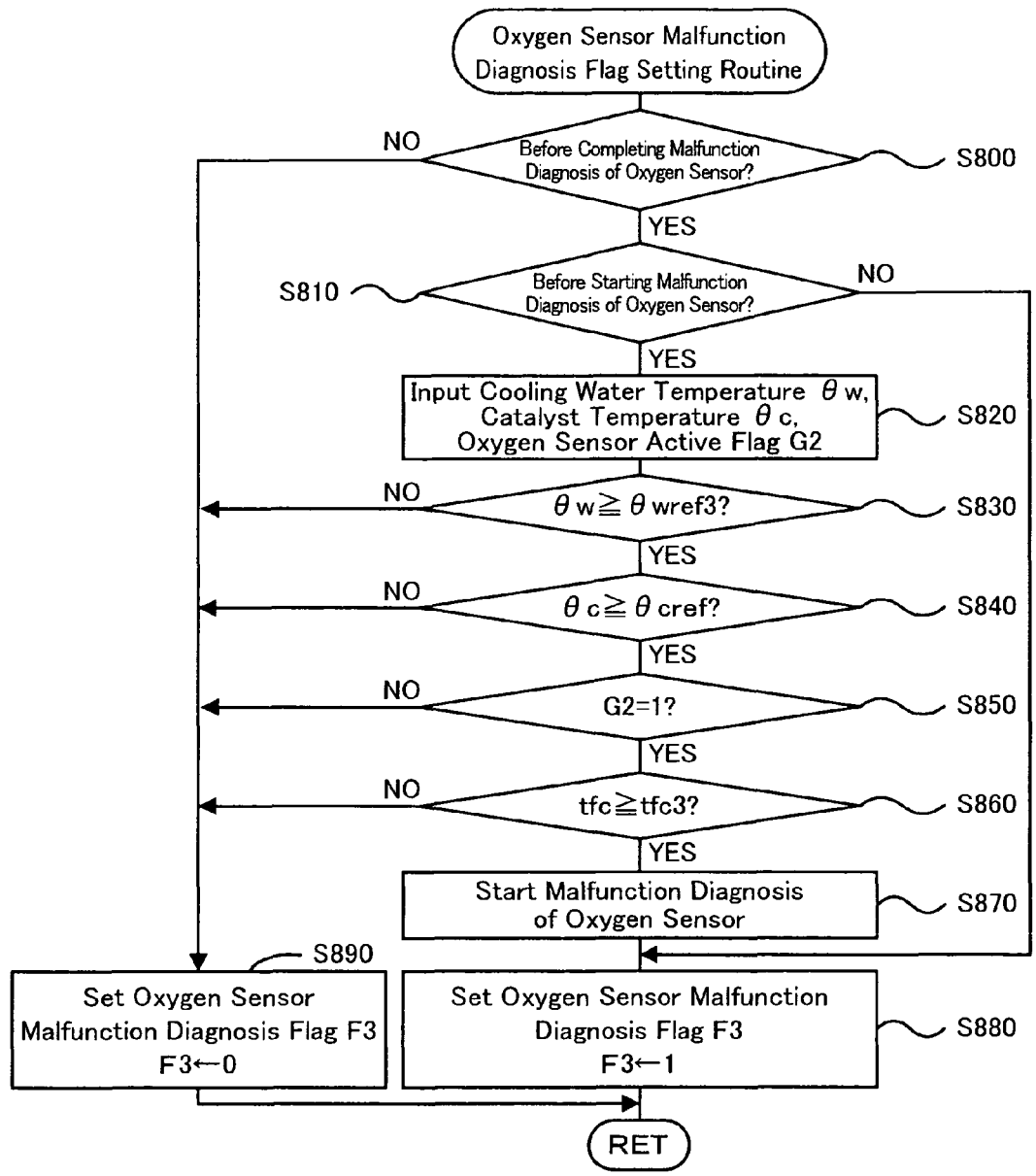
FIG. 7 is a flowchart showing an oxygen sensor malfunction diagnosis flag setting routine.

Upon determination that the fuel cut is performed, the CPU 24a inputs a fuel cut continuation time tfc defined as a continuation time of the fuel cut (step S310). The CPU 24a then sets an EGR system malfunction diagnosis flag F1 by an EGR system malfunction diagnosis flag setting routine as shown in FIG. 5 (step S320), sets an air-fuel ratio sensor malfunction diagnosis flag F2 by an air-fuel ratio sensor malfunction diagnosis flag setting routine as shown in FIG. 6 (step S330), sets an oxygen sensor malfunction diagnosis flag F3 by an oxygen sensor malfunction diagnosis flag setting routine as shown in FIG. 7 (step S340). The EGR system malfunction diagnosis flag F1, the air-fuel ratio sensor malfunction diagnosis flag F2 and the oxygen sensor malfunction diagnosis flag F3 are set to 1 when the malfunction diagnosis is performed and set to 0 when the malfunction diagnosis is not performed. The details of the EGR system malfunction diagnosis flag setting routine of FIG. 5, the air-fuel ratio sensor malfunction diagnosis flag setting routine of FIG. 6 and the oxygen sensor malfunction diagnosis flag setting routine of FIG. 7 are described with suspension of the description of the fuel cut continuation demand flag setting routine of FIG. 4.

In the EGR system malfunction diagnosis flag setting routine as shown in FIG. 5, the CPU 24a of the engine ECU 24 first determinates whether the malfunction diagnosis of the EGR system is before completion (step S500). Upon determination that the malfunction diagnosis of the EGR system is before completion, the CPU 24a subsequently determines whether the malfunction diagnosis of the EGR system is before start (whether the malfunction diagnosis of the EGR system is not being made) (step S510). Upon determination that the malfunction diagnosis of the EGR system is before start, the CPU 24a inputs the cooling water temperature θw from the water temperature sensor 142, the intake air temperature θa from the temperature sensor 149, a rotation speed difference ΔNe (present Ne−Previous Ne), and the vehicle speed V (step S520). The rotation speed difference ΔNe is input the difference between a present value and a previous value of the rotation speed Ne of the engine 22 calculated by rotation calculation routine (not shown). The vehicle speed V is detected by the vehicle speed sensor 88 and is received from the hybrid electric control unit 70 by communication.

After the data input, the CPU 24a determines whether or not a condition for making the malfunction diagnosis of the EGR system is satisfied, from the input data (steps S530 to S570). This concrete procedure in this embodiment determines whether or not all of following multiple conditions are satisfied. The multiple conditions include a condition that the input cooling water temperature θw is not less than a predetermined temperature θwref1 (for example, 70° C.) (step S530), a condition that the input intake air temperature θa is not less than a determined temperature θaref (for example, −10° C.) (step S540), a condition that an absolute value of the rotation speed difference ΔNe of the engine 22 is not more than a determined value (for example, 3 rpm) (step S550), a condition that the input vehicle speed V is not less than a predetermined vehicle speed Vref (for example, 45 km/h) (step S560), and a condition that the input fuel cut continuation time tfc is not less than the predetermined time tfc1 (for example, 800 msec) (step S570). Upon satisfaction of all of the multiple conditions at steps S530 to 5570, the CPU 24a determines that the condition for making the malfunction diagnosis of the EGR system is satisfied. Upon failure of at least one of the multiple conditions at steps S530 to S570, on the other hand, the CPU 24a determines that the condition for making the malfunction diagnosis of the EGR system is not satisfied.

Upon failure of the condition for making the malfunction diagnosis of the EGR system, the CPU 24a sets the EGR system malfunction diagnosis flag F1 to 0 (step S600) and terminates the EGR system malfunction diagnosis flag setting routine. Upon satisfaction of the condition for making the malfunction diagnosis of EGR system, on the other hand, the CPU 24a starts the malfunction diagnosis of the EGR system (step S580), sets the EGR system malfunction diagnosis flag F to 1 (step S590) and terminates the EGR system malfunction diagnosis flag setting routine. As the malfunction diagnosis of the EGR system in this embodiment, the CPU 24a calculates the difference ΔPin (=Pin1−Pin2) between the intake air pressure Pin1 and the intake air pressure Pin2 from the intake air pressure sensor 158 and determines whether or not the calculated difference ΔPin is within a predetermined range specified experimentally or otherwise. The intake air pressure Pin1 is a pressure from the air pressure sensor 158 when the EGR valve 154 is opened forcibly and the exhaust as uncombusted gas is supplied into the gas intake line. The intake air pressure Pin2 is a pressure from the air pressure sensor 158 when the EGR valve 154 is closed forcibly and the exhaust as the uncombusted gas is not supplied into the gas intake line. The CPU 24a determines that the EGR system is normal when the difference ΔPin is within the predetermined range. The CPU 24a, on the other hand, determines that the EGR system is abnormal when the difference ΔPin is not within the predetermined range. After the malfunction diagnosis of the EGR system is started, the CPU 24a determines that the malfunction diagnosis of the EGR system is not before start at step S510, sets the EGR system malfunction diagnosis flag F1 to 1 (step S590) and terminates the EGR system malfunction diagnosis flag setting routine. After the malfunction diagnosis of the EGR system is completed, the CPU 24a determines that the malfunction diagnosis of the EGR system is not before completion at step S500, sets the EGR system malfunction diagnosis flag F1 to 0 (step S600) and terminates the EGR system malfunction diagnosis flag setting routine.

The following describes the air-fuel ratio sensor malfunction diagnosis flag setting routine as shown in FIG. 6. In the air-fuel ratio malfunction diagnosis flag setting routine, the CPU 24a of the engine ECU 24 first determines whether the malfunction diagnosis of the air-fuel ratio sensor 135a is before completion (step S700). Upon determination that the malfunction diagnosis of the air-fuel ratio sensor 135a is before completion, the CPU 24a subsequently determines whether the malfunction diagnosis of the air-fuel ratio sensor 135a is before start (step S710). Upon determination that the malfunction diagnosis of the air-fuel ratio sensor 135a is before start, the CPU 24a inputs the cooling water temperature θw from the water temperature sensor 142 and an air-fuel ratio sensor active flag G1 (step S720). The air-fuel ratio sensor active flag G1 is set to 1 when the air-fuel ratio sensor 135a is operable with adequate performance, and set to 0 when otherwise. The CPU 24a determines whether or not a condition for making the malfunction diagnosis of the air-fuel ratio sensor 135a is satisfied, from the input data (steps S730 to S750). This concrete procedure in this embodiment determines whether or not all of following multiple conditions are satisfied. The multiple conditions include a condition that the input cooling water temperature θw is not less than a predetermined temperature θwref2 (for example, 75° C.) (step S730), a condition that the input air-fuel ratio sensor active flag G1 is equal to 1 (step S740), and a condition that the input fuel cut continuation time tfc is not less than the predetermined time tfc2 (for example, 2 sec) (step S750) Upon satisfaction of all of the multiple conditions at steps S730 to S750, the CPU 24a determines that the condition for making the malfunction diagnosis of the air-fuel ratio sensor 135a is satisfied. Upon failure of at least one of the multiple conditions at steps S730 to S750, on the other hand, the CPU 24a determines that the condition for making the malfunction diagnosis of the air-fuel ratio sensor 135a is not satisfied.

Upon failure of the condition for making the malfunction diagnosis of the air-fuel ratio sensor 135a, the CPU 24a sets the air-fuel ratio sensor malfunction diagnosis flag F2 to 0 (step S780) and terminates the air-fuel ratio sensor malfunction diagnosis flag setting routine. Upon satisfaction of the condition for making the malfunction diagnosis of the air-fuel ratio sensor 135a, on the other hand, the CPU 24a starts making the malfunction diagnosis of the air-fuel ratio sensor 135a (step S760), sets the air-fuel ratio sensor malfunction diagnosis flag F2 to 1 (step S770) and terminates the air-fuel ratio sensor malfunction diagnosis flag setting routine. When the fuel cut is continued, the exhaust from the engine 22 approaches to the atmosphere. As the malfunction diagnosis of the air-fuel ratio sensor 135b in this embodiment, the CPU 24a determines whether or not the output current Iaf from the air-fuel ratio sensor 135a is within a predetermined range when a time (for example 6 sec) for the exhaust from the engine 22 changing sufficiently close to the atmosphere elapses after the fuel cut is started. The predetermined range is a range specified experimentally or otherwise (a range including an output current Iaf1 envisioned when the exhaust from the engine 22 is equal to the atmosphere). The CPU 24a determines that the air-fuel ratio sensor 135a is normal when the output current from the air-fuel ratio sensor 135 is within the predetermined range. The CPU 24a, on the other hand, determines that the air-fuel ratio sensor 135a is abnormal when the output current from the air-fuel ratio sensor 135 is not within the predetermined range. After the malfunction diagnosis of the air-fuel ratio sensor 135a is started, the CPU 24a determines that the malfunction diagnosis of the air-fuel ratio sensor 135a is not before start at step S710, sets the air-fuel ratio sensor malfunction diagnosis flag F2 to 1 (step S770) and terminates the air-fuel ratio sensor malfunction diagnosis flag setting routine. After the malfunction diagnosis of the air-fuel ratio sensor 135a is completed, the CPU 24a determines that the malfunction diagnosis of the air-fuel ratio sensor 135a is not before completion at step S700, sets the EGR system malfunction diagnosis flag F2 to 0 (step S780) and terminates the air-fuel ratio sensor malfunction diagnosis flag setting routine.

The following describes the oxygen sensor malfunction diagnosis flag setting routine as shown in FIG. 7. In the oxygen malfunction diagnosis flag setting routine, the CPU 24a of the engine ECU 24 first determines whether the malfunction diagnosis of the oxygen sensor 135b is before completion (step S800). Upon determination that the malfunction diagnosis of the oxygen sensor 135b is before completion, the CPU 24a subsequently determines whether the malfunction diagnosis of the oxygen sensor 135b is before start (step S810). Upon determination that the malfunction diagnosis of the oxygen sensor 135b is before start, the CPU 24a inputs the cooling water temperature θw from the water temperature sensor 142, the catalyst temperature θc from the temperature sensor 134a and an oxygen sensor active flag G2 (step S820). The oxygen sensor active flag G2 is set to 1 when the oxygen sensor 135b is operable with adequate performance, and set to 0 when otherwise. The CPU 24a determines whether or not a condition for making the malfunction diagnosis of the oxygen sensor 135b is satisfied, from the input data (steps S830 to S860). This concrete procedure in this embodiment determines whether or not all of following multiple conditions are satisfied. The multiple conditions include a condition that the input cooling water temperature θw is not less than a predetermined temperature θwref3 (for example, 70° C.) (step S830), a condition that the catalytic temperature θc is not less than a predetermined temperature θcref (for example, 400° C.) (step S840), a condition that the input oxygen sensor active flag G2 is equal to 1 (step S850), and a condition that the input fuel cut continuation time tfc is not less than the predetermined time tfc3 (for example, 2 sec) (step S860). Upon satisfaction of all of the multiple conditions at steps S830 to S860, the CPU 24a determines that the condition for making the malfunction diagnosis of the oxygen sensor 135b is satisfied. Upon failure of at least one of the multiple conditions at steps S830 to S860, on the other hand, the CPU 24a determines that the condition for making the malfunction diagnosis of the air-fuel ratio sensor 135b is not satisfied.

Upon failure of the condition for making the malfunction diagnosis of the oxygen sensor 135b, the CPU 24a sets the oxygen sensor malfunction diagnosis flag F3 to 0 (step S890) and terminates the oxygen ratio sensor malfunction diagnosis flag setting routine. Upon satisfaction of the condition for making the malfunction diagnosis of the oxygen sensor 135b, on the other hand, the CPU 24a starts making the malfunction diagnosis of the oxygen sensor 135b (step S870), sets the oxygen sensor malfunction diagnosis flag F2 to 1 (step S880) and terminates the oxygen sensor malfunction diagnosis flag setting routine. When the fuel cut is continued, an oxygen concentration in exhaust passing through the catalytic converter 134 (hereafter this exhaust referred to as purified exhaust) approaches to the oxygen concentration in the atmosphere, because the exhaust from the engine 22 approaches to the atmosphere. As the malfunction diagnosis of the oxygen sensor 135b in this embodiment, the CPU 24a determines that the oxygen sensor 135b is normal upon determination that the output voltage Vo from the oxygen sensor 135b approaches to around the voltage Vo1 before a predetermined time (for example, 6 sec) elapses after starting the fuel cut, determines that the oxygen sensor 135b is abnormal upon determination that the output voltage Vo from the oxygen sensor 135b does not approach to around the voltage Vo1 even when the predetermined time elapses after starting the fuel cut. The voltage Vo1 is a voltage corresponding to the oxygen concentration in the atmosphere. The predetermined time is a time taken for the oxygen concentration in the purified exhaust to sufficiently approach to the oxygen concentration in the atmosphere. After the malfunction diagnosis of the oxygen sensor 135b is started, the CPU 24a determines that the malfunction diagnosis of the oxygen sensor 135b is not before start at step S810, sets the oxygen sensor malfunction diagnosis flag F3 to 1 (step S880) and terminates the oxygen sensor malfunction diagnosis flag setting routine. After the malfunction diagnosis of the oxygen sensor 135b is completed, the CPU 24a determines that the malfunction diagnosis of the oxygen sensor 135b is not before completion at step S800, sets the EGR system malfunction diagnosis flag F3 to 0 (step S890) and terminates the oxygen sensor malfunction diagnosis flag setting routine.

The settings of the EGR system malfunction diagnosis flag F1, the air-fuel ratio sensor malfunction diagnosis flag F2 and the oxygen sensor malfunction diagnosis flag F3 are described above. The explanation of the fuel cut continuation demand flag setting routine of FIG. 4 is resumed. After the settings of the EGR system malfunction diagnosis flag F1, the air-fuel ratio sensor malfunction diagnosis flag F2 and the oxygen sensor malfunction diagnosis flag F3 (steps S320 to S340), the CPU 24a identifies the values of the EGR system malfunction diagnosis flag F1, the air-fuel ratio sensor malfunction diagnosis flag F2 and the oxygen sensor malfunction diagnosis flag F3 (steps S350 to S370). When at least one of the EGR system malfunction diagnosis flag F1, the air-fuel ratio sensor malfunction diagnosis flag F2 and the oxygen sensor malfunction diagnosis flag F3 are equal to 1, or when the malfunction diagnosis of at least one of the EGR system, the air-fuel ratio sensor 135a and the oxygen sensor 135b is being made, the CPU 24a determines that the continuation of the fuel cut is demanded, sets the fuel cut continuation demand flag F to 1 (step S400) and terminates the fuel cut continuation demand flag setting routine. When all of the EGR system malfunction diagnosis flag F1, the air-fuel ratio sensor malfunction diagnosis flag F2 and the oxygen sensor malfunction diagnosis flag F3 are equal to 0, on the other hand, or when the malfunction diagnoses of all of the EGR system, the air-fuel ratio sensor 135a and the oxygen sensor 135b are not being made, the CPU 24a compares the fuel cut continuation time tfc with the predetermined time tfc0 (step S380). The predetermined time tfc0 in the embodiment is set to the longest time among the predetermined time tfc1 (for example, 800 msec), the predetermined time tfc2 (for example, 2000 msec) and the predetermined time tfc3 (for example, 2000 msec). When the fuel cut continuation time tfc is less than the predetermined time tfc0, there is a possibility of the future satisfaction of at least one of the condition for making the malfunction diagnosis of the EGR system, the condition for making the malfunction diagnosis of the air-fuel ratio sensor 135a and the condition for making the malfunction diagnosis of the oxygen sensor 135b, if the fuel cut is continued. When the fuel cut continuation time tfc is not less than the predetermined time tfc0, on the other hand, there is one case considered where neither of the condition for making the malfunction diagnosis of the EGR system, the condition for making the malfunction diagnosis of the air-fuel ratio sensor 135a and the condition for making the malfunction diagnosis of the oxygen sensor 135b has not been satisfied, and there is another case considered where the malfunction diagnoses of all objects, of which the each condition for making the malfunction diagnosis is satisfied among the EGR system, the air-fuel ratio sensor 135a and the oxygen sensor 135b, are completed. The procedure comparing the fuel cut continuation time tfc to the predetermined time tfc0 at step S380 is a procedure determining a present state. When the fuel cut continuation time tfc is less than the predetermined time tfc0, the CPU 24a sets the fuel cut continuation flag F to 1 (step S400) and terminates the fuel cut continuation demand flag setting routine. When the fuel cut continuation time tfc is not less than the predetermined time tfc0, the CPU 24a sets the fuel cut continuation flag F to 0 (step S400) and terminates the fuel cut continuation demand flag setting routine. The fuel cut continuation flag F is set to 1 when the malfunction diagnosis of at least one of the EGR system, the air-fuel ratio sensor 135a and the oxygen sensor 135b is being made, and when there is a possibility of the future satisfaction of at least one of the condition for making the malfunction diagnosis of the EGR system, the condition for making the malfunction diagnosis of the air-fuel ratio sensor 135a and the condition for making the malfunction diagnosis of the oxygen sensor 135b, if the fuel cut is continued for a certain amount of time. The fuel cut continuation flag F is set to 0 when neither of the condition for making the malfunction diagnosis of the EGR system, the condition for making the malfunction diagnosis of the air-fuel ratio sensor 135a, and the condition for making the malfunction diagnosis of the oxygen sensor 135b has not been satisfied, and when the malfunction diagnoses of all objects, of which the each condition for making the malfunction diagnosis is satisfied among the EGR system, the air-fuel ratio sensor 135a and the oxygen sensor 135b, are completed.

Figure 8:
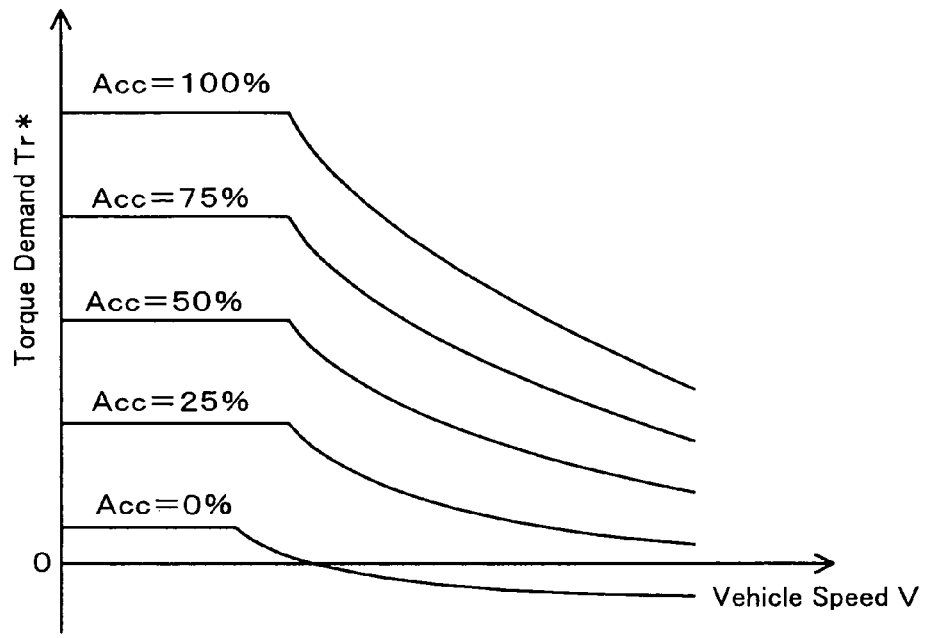
FIG. 8 shows one example of a torque demand setting map.

The fuel cut continuation demand flag setting routine are described above. The explanation of the drive control routine of FIG. 3 is resumed. After the data input at step S110, the CPU 72 sets a torque demand Tr* to be output to the ring gear shaft 32a or the drive shaft linked with the drive wheels 63a and 63b as a torque required for the hybrid vehicle 20 and a power demand Pe* required for the engine 22 based on the input accelerator opening Acc and the input vehicle speed V (step S110). A concrete procedure of setting the torque demand Tr* in this embodiment provides and stores in advance variations in torque demand Tr* against the vehicle speed V with regard to various settings of the accelerator opening Acc as a torque demand setting map in the ROM 74 and reads the torque demand Tr* corresponding to the given accelerator opening Acc and the given vehicle speed V from this torque demand setting map. One example of the torque demand setting map is shown in FIG. 8. The power demand Pe* is calculated as the sum of the product of the set torque demand Tr* and a rotation speed Nr of the ring gear shaft 32a, the charge-discharge power demand Pb* to be charged into or discharged from the battery 50, and a potential loss. The rotation speed Nr of the ring gear shaft 32a is obtained by multiplying the vehicle speed V by a preset conversion factor k or by dividing the rotation speed Nm2 of the motor MG2 by a gear ratio Gr of the reduction gear 35.

Figure 9:
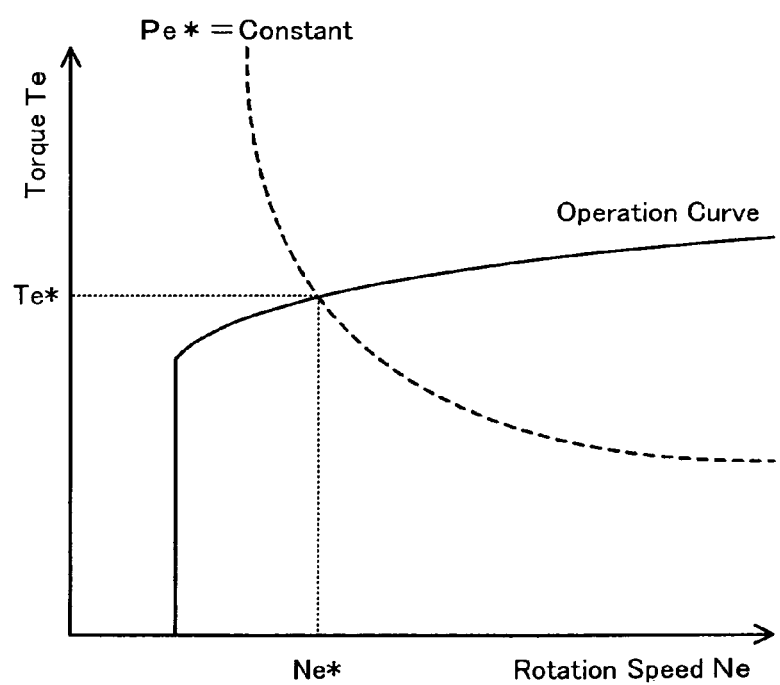
FIG. 9 shows an efficient operation curve of an engine to set a target rotation speed Ne* and a target torque Te*.

The CPU 72 compares the set power demand Pe* to a reference value Pref (step S120). The reference value Pref is set to a lower limit value or otherwise a power range of ensuring efficient operation of the engine 22. When the set power demand Pe* is not less than the reference value Pref, there is a requirement for the operation of the engine 22. A target rotation speed Ne* and a target torque Te* defining a target drive point of the engine 22 are set based on the set power demand Pe* of the engine 22 and are sent to the engine ECU 24 (step S130). In this embodiment, the target rotation speed Ne* and the target torque Te* are determined according to an operation curve of ensuring efficient operation of the engine 22 and a curve of the engine power demand Pe*. FIG. 9 shows an operation curve of the engine 22 used to set the target rotation speed Ne* and the target torque Te*. As clearly shown in FIG. 9, the target rotation speed Ne* and the target torque Te* are given as an intersection of the operation curve and a curve of constant power demand Pe*(=Ne*×Te*). In response to reception of the settings of the target rotation speed Ne* and the target torque Te*, the engine ECU 24 performs required controls including intake air flow regulation, ignition control, fuel injection control, and open close timing control of the variable valve timing mechanism 150, of the engine 22 to drive the engine 22 at the specific drive point defined by the combination of the target rotation speed Ne* and the target torque Te*. EGR valve 154 is controlled in order to supply the exhaust as the uncombusted gas into the gas intake line according to the requirement.

The CPU 72 then calculates a target rotation speed Nm1* of the motor MG1 from the target rotation speed Ne* of the engine 22, the rotation speed Nm2 of the motor MG2, and a gear ratio ρ of the power distribution integration mechanism 30 according to Equation (1) given below, while calculating a torque command Tm1* of the motor MG1 from the calculated target rotation speed Nm1*, the input rotation speed Nm1 of the motor MG1, the target torque Te* of the engine 22 and the gear ratio ρ of the power distribution integration mechanism 30 according to Equation (2) given below (step S140):

$$Nm1^* = Ne^* \cdot (1+\rho)/\rho - Nm2/(Gr \cdot \rho) \quad (1)$$

$$Tm1^* = -\rho \cdot Te^*/(1+\rho) + k1(Nm1^* - Nm1) + k2\int (Nm1^* - Nm1)dt \quad (2)$$

The CPU 72 subsequently adds the result of division of the torque command Tm1* by the gear ratio ρ of the power distribution integration mechanism 30 to the torque demand Tr*, and specifies a torque command Tm2* of the motor MG2 by dividing the result of the addition by the gear ratio Gr of the reduction gear 35, according to Equation (3) given below (step S150):

$$Tm2tmp = (Tr^* + Tm1^*/\rho)/Gr \quad (3)$$

Figure 10:
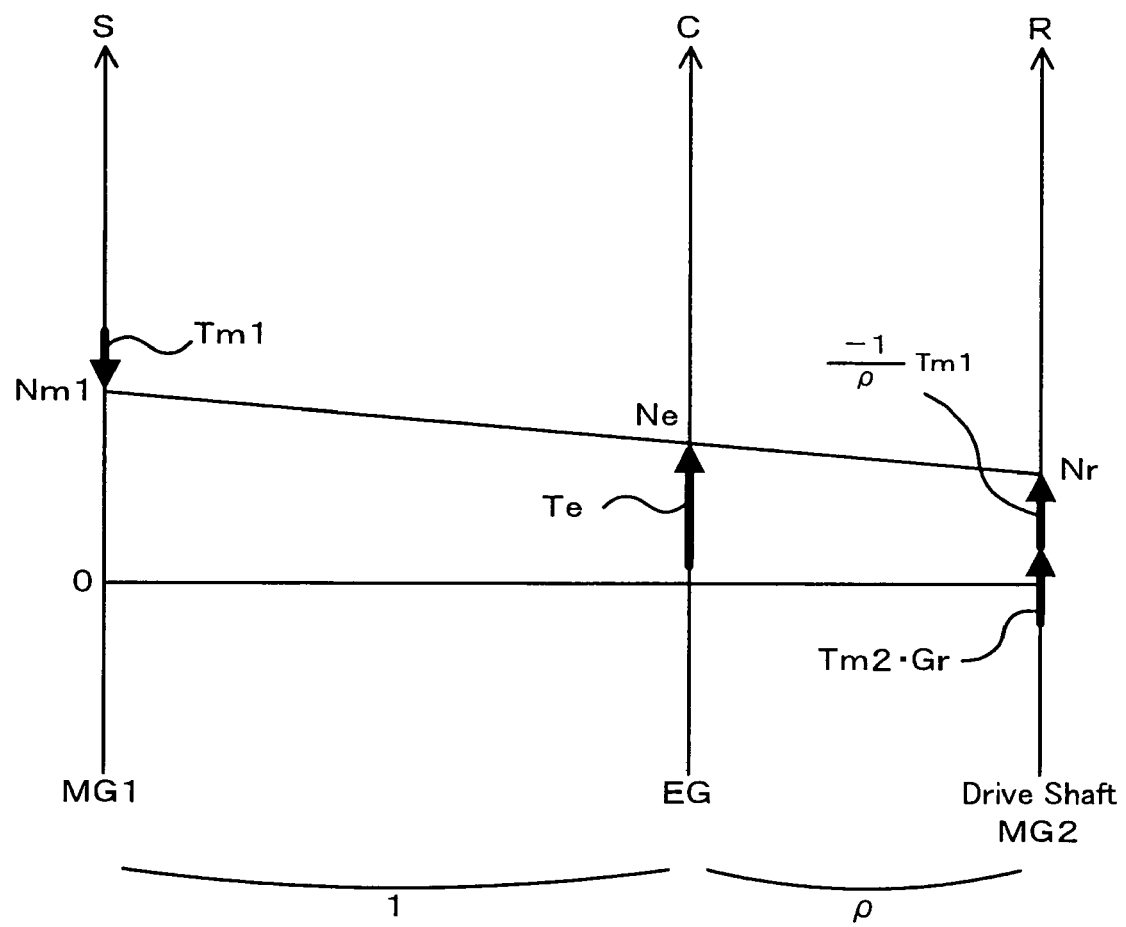
FIG. 10 is an alignment chart showing torque-rotation speed dynamics of respective rotational elements of a power distribution integration mechanism 30.

The settings of the torque commands Tm1* and Tm2* of the motors MG1 and MG2 are set to the motor ECU 40 (step S160), and the drive control routine is terminated. Equation (1) is a dynamic relational expression of respective rotational elements included in the power distribution integration mechanism 30. FIG. 10 is an alignment chart showing torque-rotation speed dynamics of the respective rotational elements included in the power distribution integration mechanism 30 during the drive of the hybrid vehicle 20 with output power of the engine 22. The left axis 'S' represents a rotation speed of the sun gear 31 that is equivalent to the rotation speed Nm1 of the motor MG1. The middle axis 'C' represents a rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35. Equation (1) and (3) are readily introduced from this alignment chart. Two thick arrows on the axis 'R' respectively show a torque applied to the ring gear shaft 32a by output of the torque Tm1 from the motor MG1, and a torque applied to the ring gear shaft 32a via the reduction gear 35 by output of the torque Tm2 from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term. In response to reception of the settings of the torque commands Tm1* and Tm2*, the motor ECU 40 performs switching control of the inverter 41, 42 to drive the motor MG1 with the torque command Tm1* and the motor MG2 with the torque command Tm2*. Such control enables the torque demand Tr* to be output to the ring gear shaft 32a or the drive shaft for driving the hybrid vehicle 20 while operating the engine 22 efficiently.

When the set power demand Pe* is less than the reference value Pref at step s120, the CPU 72 compares the power demand (previous Pe*) set in a previous cycle of this drive control routine to the reference value Pref (step S170). When the previous power demand (previous Pe*) is not less than the reference value Pref, the CPU 72 determines that it is just after the power demand Pe* becomes less than the reference value Pref, sends a fuel cut command of the engine 22 to the engine ECU 24 (step S180). The CPU 72 subsequently sets the torque command Tm1* of the motor MG1 in order to perform the mortaring or the engine 22 so as not to change significantly the rotation speed Ne of the engine 22, as the torque command Tm1* of the motor MG1 (step S190), and sets the torque command Tm2* of the motor MG2 from the torque demand Tr* and the torque command Tm1* (step S150). The settings of the torque commands Tm1* and Tm2* of the motors MG1 and MG2 are set to the motor ECU 40 (step S160), and the drive control routine is terminated. Such control enables the torque demand Tr* to be output to the ring gear shaft 32a or the drive shaft for driving the hybrid vehicle 20 while stopping the fuel injection of the engine 22 and performing the motoring of the engine 22 by means of the motor MG1. When the previous power demand (previous Pe*) is less than the reference value Pref at step s170, on the other hand, the CPU 72 identifies that the value of the fuel cut continuation demand flag F (step S200). When the fuel cut continuation demand flag F is equal to 1, the fuel cut command is sent to the engine ECU 24 (step S180). The drive control routine is terminated after executing the processing of the steps S190, S150 and S160. When the fuel cut continuation demand flag F is equal to 0, both the target rotation speed Ne* and the target torque Te* are set to 0 so as to stop the engine 22, and sent to the engine ECU 24 (step S210). The torque command Tm1* of the motor MG1 is set to 0 (step S220). The drive control routine is terminated after executing steps S150 and S160. The fuel cut continuation demand flag F, as mentioned previously, is set to 1 when making the malfunction diagnosis of at least one of the EGR system, the air-fuel ratio sensor 135a and the oxygen sensor 135b, and when there is a possibility of the future satisfaction of at least one of the condition for making the malfunction diagnosis of the EGR system, the condition for making the malfunction diagnosis of the air-fuel ratio sensor 135a and the condition for making the malfunction diagnosis of the oxygen sensor 135b, if the fuel cut is continued. The fuel cut of the engine 22 and performing the mortaring of the engine 22 by means of the motor MG1 are thereby continued until the completion of the malfunction diagnoses of all objects, of which the each condition for making the malfunction diagnosis is satisfied among the EGR system, the air-fuel ratio sensor 135a and the oxygen sensor 135b. This arrangement ensures the occasions for making the malfunction diagnoses of the EGR system, the air-fuel ratio sensor 135a and the oxygen sensor 135b.

In the hybrid vehicle 20 of the embodiment described above, upon satisfaction of the condition for making the malfunction diagnosis at least one of the EGR system, the air-fuel ratio sensor 135a and the oxygen sensor 135b during the fuel cut of the engine 22, the malfunction diagnoses of all objects, of which the each condition for making the malfunction diagnosis is satisfied among the EGR system, the air-fuel ratio sensor 135a and the oxygen sensor 135b, are made, and the engine 22, the motors MG1 and MG2 are controlled so as to output the torque demand Tr* to the ring gear shaft 32a or the drive shaft with continuation of the fuel cut of the engine 22 and of performing the mortaring of the engine 22 by means of the motor MG1 until the completion of the malfunction diagnoses of all objects, of which the each condition for making the malfunction diagnosis is satisfied among the EGR system, the air-fuel ratio sensor 135a and the oxygen sensor 135b. This arrangement ensures the occasions for making the malfunction diagnoses of the EGR system, the air-fuel ratio sensor 135a and the oxygen sensor 135b.

In the hybrid vehicle 20 of the embodiment, the CPU 24a makes the malfunction diagnoses of all objects, of which the each condition for making the malfunction diagnosis is satisfied among the EGR system, the air-fuel ratio sensor 135a and the oxygen sensor 135b during fuel cut of the engine 22. In one modified embodiment, the CPU 24a may make the malfunction diagnoses of all objects, of which the each condition for making the malfunction diagnosis is satisfied within the EGR system and the air-fuel ratio sensor 135a. In another modified embodiment, the CPU 24a may make the malfunction diagnoses of all objects, of which the each condition for making the malfunction diagnosis is satisfied within the EGR system and the oxygen sensor 135b. The CPU 24a may only make the malfunction diagnoses of the EGR system.

In the hybrid vehicle 20 of the embodiment, satisfaction or dissatisfaction of the condition for making the malfunction diagnosis of the EGR system is determined according to the cooling water temperature θw, the intake air temperature θa, the difference ΔNe of the rotation speed of the engine 22, the vehicle speed V and the fuel cut continuation time tfc. The satisfaction or dissatisfaction may, however, be determined according to a part of them or according to at least one of other parameters (for example, atmosphere pressure) in addition to or in place of them. In the hybrid vehicle 20 of the embodiment, satisfaction or dissatisfaction of the condition for making the malfunction diagnosis of the air-fuel ratio sensor 135a is determined according to the cooling water temperature θw, the air-fuel ratio sensor active flag G1 and the fuel cut continuation time tfc. The satisfaction or dissatisfaction may, however, be determined according to a part of them or according to at least one of other parameters (for example, atmosphere pressure) in addition to or in place of them. In the hybrid vehicle 20 of the embodiment, satisfaction or dissatisfaction of the condition for making the malfunction diagnosis of the oxygen sensor 135b is determined according to the cooling water temperature θw, the catalyst temperature θc the oxygen sensor active flag G2 and the fuel cut continuation time tfc. The satisfaction or dissatisfaction may, however, be determined according to a part of them or according to at least one of other parameters (for example, atmosphere pressure) in addition to or in place of them.

In the hybrid vehicle 20 of the embodiment, the motor MG2 is attached to the ring gear shaft 32a or the drive shaft via the reduction gear 35. The technique of the invention is also applicable to the motor MG2 directly attached to the ring gear shaft 32a, and also applicable to the motor MG2 attached to the ring gear shaft 32a via a transmission such as a two-stage, three-stage, or four-stage transmission in place of the reduction gear 35.

Figure 11:
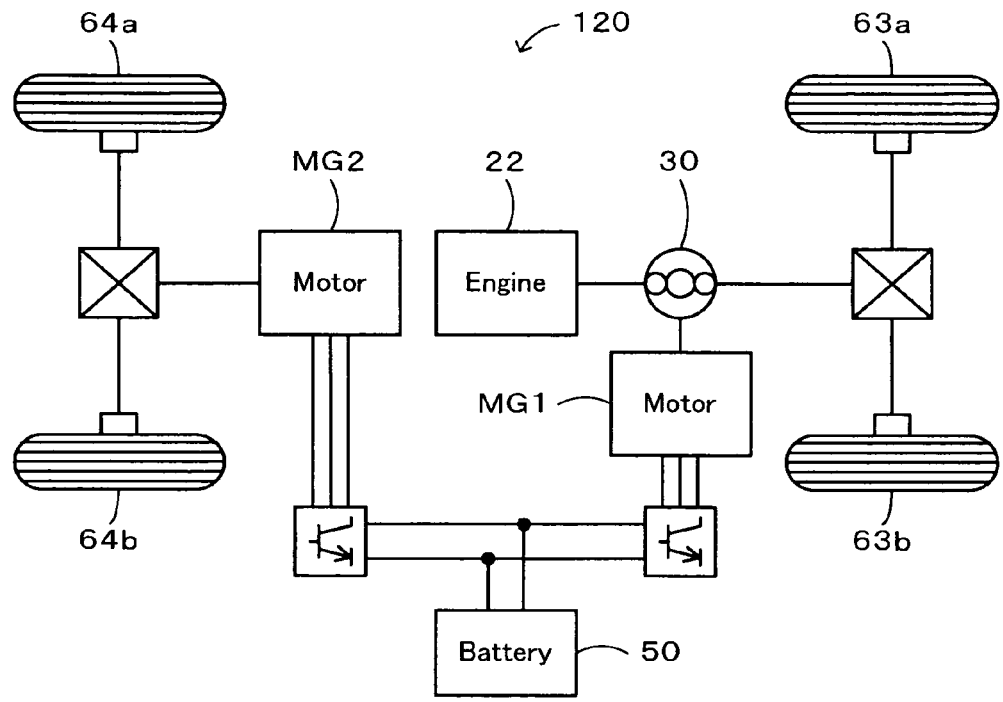
FIG. 11 schematically illustrates the configuration of a hybrid vehicle 120 in one modified example.

In the hybrid vehicle 20 of the embodiment, the power of the motor MG2 is converted by the reduction gear 35 and is output to the ring gear shaft 32a. The technique of the invention is also applicable to a hybrid vehicle 120 of a modified structure shown in FIG. 11. In the hybrid vehicle 120 of FIG. 18, the power of the motor MG2 is connected to another axle (an axle linked with wheels 64a and 64b) that is different from the axle connecting with the ring gear shaft 32a (the axle linked with the drive wheels 63a and 63b).

Figure 12:
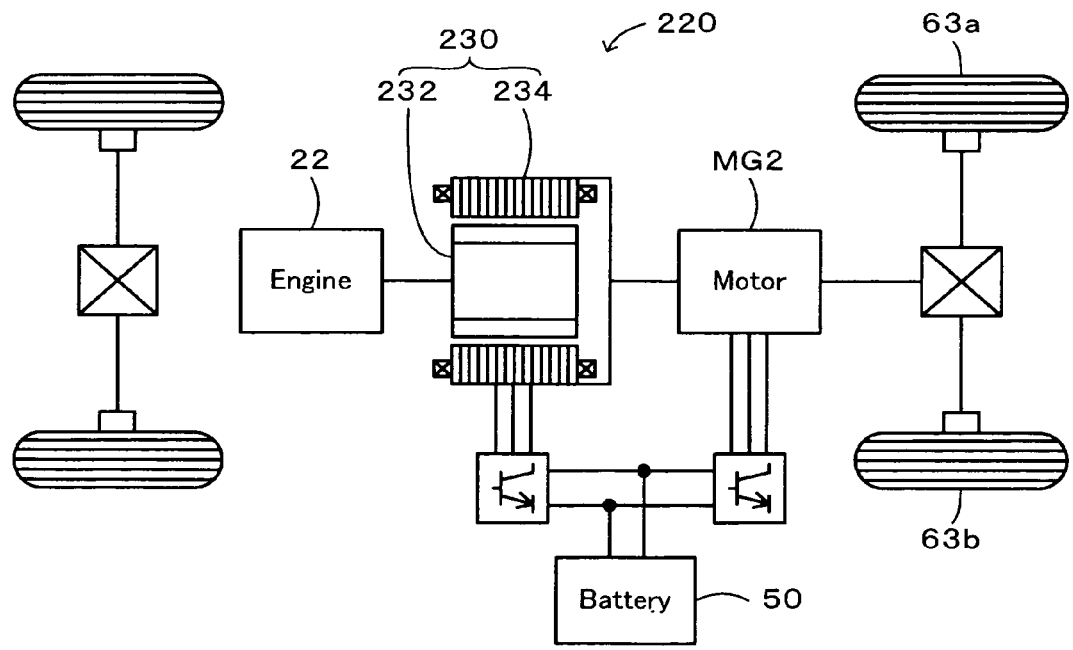
FIG. 12 schematically illustrates the configuration of a hybrid vehicle 220 in one modified example.

In the hybrid vehicle 20 of the embodiment, the power of the engine 22 is output via the power distribution integration mechanism 30 to the ring gear shaft 32a or the driveshaft linked with the drive wheels 63a and 63b. The technique of the invention is also applicable to a hybrid vehicle 220 of another modified structure shown in FIG. 12. The hybrid vehicle 220 of FIG. 12 is equipped with a pair-rotor motor 230. The pair-rotor motor 230 includes an inner rotor 232 connected to the crankshaft 26 of the engine 22 and an outer rotor 234 connected to a driveshaft for outputting power to the drive wheels 63a and 63b. The pair-rotor motor 230 transmits part of the output power of the engine 22 to the driveshaft, while converting the residual engine output power into electric power.

The embodiment and its modified examples regard application of the invention to the hybrid vehicles. The principle of the invention may be actualized by diversity of other applications, for example, vehicles other than motor vehicles as well as a control method of such a vehicle.

The primary elements in the embodiment and its modified examples are mapped to the primary constituents in the claims of the invention as described below. The engine 22 in the embodiment corresponds to the 'internal combustion engine' in the claims of the invention. The EGR tube 152 and the EGR valve 154 in the embodiment correspond to the 'exhaust circulation structure' in the claims of the invention. The combination of the power distribution integration mechanism 30 with the motor MG1 in the embodiment corresponds to the 'motoring structure' in the claims of the invention. The motor MG2 in the embodiment corresponds to the 'motor' in the claims of the invention. The combination of the engine ECU 24 executing the fuel cut continuation demand flag setting routine of FIG. 4, including the EGR system malfunction diagnosis flag setting routine of FIG. 5, the air-fuel ratio sensor malfunction diagnosis flag setting routine of FIG. 6 and the oxygen sensor malfunction diagnosis flag setting routine of FIG. 7, and the hybrid electronic control unit 70 executing the drive control routine of FIG. 3 in the embodiment correspond to the 'controller' in the claims of the invention. Upon satisfaction of the condition for making the malfunction diagnosis at least one of the EGR system, the air-fuel ratio sensor 135a and the oxygen sensor 135b during the fuel cut of the engine 22, the engine ECU 24 makes the malfunction diagnoses of all objects, of which the each condition for making the malfunction diagnosis is satisfied among the EGR system, the air-fuel ratio sensor 135a and the oxygen sensor 135b. The hybrid electronic control unit 70 controls the engine 22 and the motors MG1 and MG2 so as to output the torque demand Tr* to the ring gear shaft 32a or the drive shaft with continuation of the fuel cut of the engine 22 and of performing the mortaring of the engine 22 by means of the motor MG1 until the completion of the malfunction diagnoses of all objects, of which the each condition for making the malfunction diagnosis is satisfied among the EGR system, the air-fuel ratio sensor 135a and the oxygen sensor 135b. The motor MG1 in the embodiment corresponds to the 'generator' in the claims of the invention. The power distribution integration mechanism 30 in the embodiment corresponds to the 'three shaft-type power input output structure' in the claims of the invention. The pair-rotor motor 230 in the modified example also corresponds to the 'electric power-mechanical power input output assembly' in the claims of the invention. The 'internal combustion engine' is not restricted to the internal combustion engine designed to consume a hydrocarbon fuel, such as gasoline or light oil, and thereby output power, but may be any type of an internal combustion engine configured to output power to a drive shaft connected with drive wheels, for example, a hydrogen engine. The 'exhaust circulation structure' is not restricted to the EGR tube 152 and the EGR valve 154 but may be any other structure configured to circulate exhaust from the internal combustion engine into the gas intake line of the internal combustion engine. The 'motoring structure' is not restricted to the combination of the power distribution integration mechanism 30 with the motor MG1 or to the pair-rotor motor 230, but may be any structure configured to perform a motoring of the internal combustion engine. The 'motor' is not restricted to the motor MG2 constructed as a synchronous motor generator, but may be any type of motor configured to input and output power from and to the drive shaft, for example, an induction motor. The 'controller' is not restricted to the arrangement of, upon satisfaction of the condition for making the malfunction diagnosis at least one of the EGR system, the air-fuel ratio sensor 135a and the oxygen sensor 135b during the fuel cut of the engine 22, making the malfunction diagnoses of all objects, of which the each condition for making the malfunction diagnosis is satisfied among the EGR system, the air-fuel ratio sensor 135a and the oxygen sensor 135b, and controlling the engine 22, the motors MG1 and MG2 so as to output the torque demand Tr* to the ring gear shaft 32a or the drive shaft with continuation of the fuel cut of the engine 22 and of performing the mortaring of the engine 22 by means of the motor MG1 until the completion of the malfunction diagnoses of all objects, of which the each condition for making the malfunction diagnosis is satisfied among the EGR system, the air-fuel ratio sensor 135a and the oxygen sensor 135b, but may be any other arrangement, but may be any arrangement of, upon satisfaction of a first predetermined condition while a fuel injection into the internal combustion engine is stopped, making a malfunction diagnosis of the exhaust circulation structure and controlling the internal combustion engine system, the motoring structure and the motor to output a driving force with continuation of stopping the fuel injection into the internal combustion engine and of performing the motoring of the internal combustion engine by means of the motoring structure at least until the malfunction diagnosis of the exhaust circulation structure is completed, for example, an arrangement of making the malfunction diagnoses of all objects, of which the each condition for making the malfunction diagnosis is satisfied within the EGR system and the air-fuel ratio sensor 135a or an arrangement of making the malfunction diagnoses of all objects, of which the each condition for making the malfunction diagnosis is satisfied within the EGR system and the oxygen sensor 135b or only making the malfunction diagnoses of the EGR system. The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

There may be many other modifications, changes, and alterations without departing from the scope or spirit of the main characteristics of the present invention.

INDUSTRIAL APPLICABILITY

The principle of the present invention is preferably applied to the manufacturing industries of vehicles.

The invention claimed is:

1. A vehicle, comprising:
    an internal combustion engine system having an internal combustion engine configured to output power to a drive shaft connected with drive wheels, and an exhaust circulation structure configured to circulate exhaust from the internal combustion engine into a gas intake line of the internal combustion engine;
    a motoring structure configured to perform a motoring of the internal combustion engine;
    a motor configured to input and output power from and to the drive shaft; and
    a controller configured to, upon satisfaction of a first predetermined condition while a fuel injection into the internal combustion engine is stopped, make a malfunction diagnosis of the exhaust circulation structure and control the internal combustion engine system, the motoring structure and the motor to output a driving force with continuation of stopping the fuel injection into the internal combustion engine and of performing the motoring of the internal combustion engine by means of the motoring structure at least until the malfunction diagnosis of the exhaust circulation structure is completed.

2. The vehicle in accordance with claim 1, wherein the controller makes the malfunction diagnosis of the exhaust circulation structure upon satisfaction of the first predetermined condition that includes at least one of multiple conditions including a condition that a water temperature of the internal combustion engine is not less than a first predetermined water temperature, a condition that an intake air temperature of the internal combustion engine is not less than a predetermined temperature, a condition that a variation level of a rotation speed of the internal combustion engine is within a predetermined variation level range, a condition that a first predetermined time elapses after starting the internal combustion engine, a condition that a vehicle speed is not less than a predetermined vehicle speed, and a condition that stopping the fuel injection continues for a second predetermined time.

3. The vehicle in accordance with claim 1, wherein the internal combustion engine system has:
    a purification catalyst configured to purify the exhaust from the internal combustion engine; and
    an oxygen detector configured to detect a oxygen concentration in exhaust passing through the purification catalyst, and
    the controller, upon satisfaction of a second predetermined condition when the fuel injection into the internal combustion engine is stopped, makes a malfunction diagnosis of the oxygen detector and controls the internal combustion engine system and the motoring structure so as to continue to stop the fuel injection into the internal combustion engine and to perform the motoring of the internal combustion engine by means of the motoring structure at least until the malfunction diagnosis of the oxygen detector is completed.

4. The vehicle in accordance with claim 3, wherein the controller makes the malfunction diagnosis of the oxygen detector upon satisfaction of the second predetermined condition that includes at least one of multiple conditions including a condition that a water temperature of the internal combustion engine is not less than a second predetermined water temperature, a condition that a state of the oxygen detector is a first predetermined state, and a condition that stopping the fuel injection continues for a third predetermined time.

5. The vehicle in accordance with claim 1, wherein the internal combustion engine system has an air-fuel ratio detector configured to detect an air-fuel ratio, and
    the controller, upon satisfaction of a third predetermined condition when the fuel injection into the internal combustion engine is stopped, makes a malfunction diagnosis of the air-fuel ratio detector and controls the internal combustion engine system and the motoring structure so as to continue to stop the fuel injection into the internal combustion engine and to perform the motoring of the internal combustion engine by means of the motoring structure at least until the malfunction diagnosis of the air-fuel ratio detector is completed.

6. The vehicle in accordance with claim 5, wherein the controller makes the malfunction diagnosis of the air-fuel ratio detector upon satisfaction of the third predetermined condition that includes at least one of multiple conditions including a condition that a water temperature of the internal combustion engine is not less than a third predetermined water temperature, a condition that a state of the air-fuel detector is a second predetermined state, and a condition that stopping the fuel injection continues for a fourth predetermined time.

7. The vehicle in accordance with claim 1, wherein the motoring structure is an electric power-mechanical power input output assembly that is connected with the drive shaft and with an output shaft of the internal combustion engine in such a manner as to be rotatable independently of the drive shaft and inputs and outputs power to and from the drive shaft and the output shaft through input and output of electric power and mechanical power.

8. The vehicle in accordance with claim 7, wherein the electric power-mechanical power input output assembly has:
    a generator configured to input and output power; and
    a three shaft-type power input output assembly connected with three shafts, the drive shaft, the output shaft and a rotating shaft of the generator and designed to input and output power to residual shaft based on powers input from and output to any two shafts among the three shafts.

9. A control method of a vehicle, the vehicle comprising:
    an internal combustion engine system having an internal combustion engine configured to output power to a drive shaft connected with drive wheels, and an exhaust circulation structure configured to circulate exhaust from the internal combustion engine into a gas intake line of the internal combustion engine; a motoring structure configured to perform a motoring of the internal combustion engine; and a motor configured to input and output power from and to the drive shaft;

the control, method comprising:
making, with an electronic control unit, a malfunction diagnosis of the exhaust circulation structure upon satisfaction of a first predetermined condition while a fuel injection into the internal combustion engine is stopped; and
controlling, with the electronic control unit, the internal combustion engine system, the motoring structure and the motor to output a driving force while continuing stoppage of the fuel injection into the internal combustion engine and to perform the motoring of the internal combustion engine by means of the motoring structure at least until the malfunction diagnosis of the exhaust circulation structure is completed.

* * * * *